US010509210B2

(12) United States Patent
Cook

(10) Patent No.: US 10,509,210 B2
(45) Date of Patent: Dec. 17, 2019

(54) TWO-COLOR VERY WIDE FIELD OF VIEW REFRACTIVE EYEPIECE-TYPE OPTICAL FORM

(71) Applicant: RAYTHEON COMPANY, Waltham, MA (US)

(72) Inventor: Lacy G. Cook, El Segundo, CA (US)

(73) Assignee: RAYTHEON COMPANY, Waltham, MA (US)

(*) Notice: Subject to any disclaimer, the term of this patent is extended or adjusted under 35 U.S.C. 154(b) by 193 days.

(21) Appl. No.: 15/676,419

(22) Filed: Aug. 14, 2017

(65) Prior Publication Data

US 2019/0049705 A1 Feb. 14, 2019

(51) Int. Cl.
*G02B 13/14* (2006.01)
*G02B 25/00* (2006.01)
*G02B 3/04* (2006.01)

(52) U.S. Cl.
CPC ............... *G02B 13/14* (2013.01); *G02B 3/04* (2013.01); *G02B 13/146* (2013.01); *G02B 25/001* (2013.01)

(58) Field of Classification Search
CPC ........ G02B 13/14; G02B 13/146; G02B 3/04; G02B 25/001; G02B 23/2492; G01J 5/061; G01J 5/08; G01J 5/0806; G01J 5/0843
USPC ....................................................... 250/353
See application file for complete search history.

(56) References Cited

U.S. PATENT DOCUMENTS 4,507,551 A 3/1985 Howard et al.
4,827,130 A 5/1989 Reno
2007/0183024 A1 8/2007 Tejada
2013/0187047 A1 7/2013 Cook
2014/0002665 A1* 1/2014 Kingdon ............... H04N 5/33
   348/164
2019/0025555 A1* 1/2019 Cook ..................... G02B 13/14

FOREIGN PATENT DOCUMENTS

WO 03044476 A1 5/2003
WO 2009055102 A2 4/2009

OTHER PUBLICATIONS

International Search Report and Written Opinion in application No. PCT/US2018/033868 dated Aug. 31, 2018.

* cited by examiner

*Primary Examiner* — David P Porta
*Assistant Examiner* — Meenakshi S Sahu
(74) *Attorney, Agent, or Firm* — Lando & Anastasi, LLP

(57) ABSTRACT

A dual-band refractive optical system having an eyepiece-type arrangement and configured for mid-wave infrared and long-wave infrared operation. In one example the optical system includes a plurality of lenses, each constructed from a material that is optically transparent in the mid-wave infrared and long-wave infrared spectral bands. The lenses are arranged to receive infrared electromagnetic radiation in an operating waveband that includes at least a portion of the mid-wave infrared and at least a portion of the long-wave infrared spectral bands via a front external aperture stop and to focus the infrared electromagnetic radiation onto a rear image plane, the lenses being positioned between the front external aperture stop and rear image plane. The optical system can further include a corrector plate positioned coincident with the front aperture stop.

20 Claims, 3 Drawing Sheets

| Surface | Element | Rd | CC | Ad | Ae | Af | Ag | Thickness | Material |
|---|---|---|---|---|---|---|---|---|---|
| 1 | Corrector (110) and Stop (120) | Inf | | -5.965E-02 | 1.152E-02 | -1.010E+01 | | 0.1000 | Amtir1 |
| 2 | | Inf | | | | | | 0.1051 | Air |
| 3 | Lens 1 (210) | -1.0657 | | -1.840E+00 | 1.472E+01 | -3.959E+01 | | 0.1000 | BaF2 |
| 4 | | 0.7195 | | | | | | 0.0148 | Air |
| 5 | Lens 2 (220) | -0.7867 | | | | | | 0.1137 | Amtir1 |
| 6 | | -0.6205 | | 7.976E-01 | 2.484E+00 | -8.571E-01 | | 0.0200 | Air |
| 7 | Lens 3 (230) | -1.3582 | | | | | | 0.2520 | Amtir1 |
| 8 | | -2.6493 | | -7.218E-01 | 5.465E-01 | -3.384E-01 | | 0.0841 | Air |
| 9 | Lens 4 (240) | -1.0085 | | | | | | 0.1269 | BaF2 |
| 10 | | -1.6433 | | | | | | 0.0200 | Air |
| 11 | Lens 5 (250) | -2.9414 | | | | | | 0.3211 | Amtir1 |
| 12 | | -1.3370 | | 7.137E-02 | -1.797E-02 | -2.113E-02 | 1.912E-02 | 0.0200 | Air |
| 13 | Lens 6 (260) | 6.8542 | | -2.080E-03 | -1.608E-02 | 1.548E-02 | | 0.1502 | Amtir1 |
| 14 | | 19.3775 | | | | | | 0.0200 | Air |
| 15 | Lens 7 (270) | 1.5043 | | 5.555E-02 | -2.037E-01 | 1.549E-01 | | 0.2829 | Amtir1 |
| 16 | | 1.8382 | | | | | | 0.0200 | Air |
| 17 | Lens 8 (280) | 1.8486 | | | | | | 0.1000 | BaF2 |
| 18 | | 0.9219 | 0.35188 | -1.779E-01 | -9.834E-01 | 2.244E-01 | | | Air |

Linear units are in inches (in.)
Angular units are in degrees (deg.)
Full image size is 1.3785 in. (with 19% distortion)
Full FOV is 131.0 deg.
Paraxial focal length is 0.753 in.
Paraxial speed is F/2.00
Stop diameter is 0.376 in.
MWIR spectral band is nominal 3.6 to 5.0 microns
LWIR spectral band is nominal 7.4 to 10.0 microns

FIG. 2

TWO-COLOR VERY WIDE FIELD OF VIEW REFRACTIVE EYEPIECE-TYPE OPTICAL FORM

BACKGROUND

An eyepiece is a type of lens system that can be attached to a variety of optical devices such as telescopes and microscopes. An objective lens or mirror collects light and brings it to focus creating an image. The eyepiece is placed near the focal point of the objective to magnify this image, with the amount of magnification generally being dependent on the focal length of the eyepiece. An eyepiece typically includes several lens elements. The entrance pupil of the eyepiece is external or located outside of the eyepiece system (i.e., on the objective or object space side of all the lens elements making up the eyepiece). Generally, an eyepiece is designed for optimal performance for a specific distance to this entrance pupil (i.e. with minimum aberrations for this distance). The distance between the entrance pupil and the first lens of the eyepiece can vary greatly depending on the design and intended application of the eyepiece. For example, in a refracting astronomical telescope the entrance pupil may be several feet distant from the eyepiece; whereas in a microscope the entrance pupil may be only a few inches from the eyepiece. More generally, any optical system with a similar external entrance pupil can be termed eyepiece-like, and in common with classical eyepieces, such optical systems, because of the lack of symmetry about that external pupil, are known to be difficult to correct for off-axis aberrations, notably coma, astigmatism, and lateral color.

SUMMARY OF INVENTION

Aspects and embodiments are directed to a refractive eyepiece-type optical form, and to optical systems incorporating same.

According to one embodiment a dual-band refractive optical system configured for mid-wave infrared and long-wave infrared operation includes a plurality of lenses, each constructed from a material that is optically transparent in the mid-wave infrared and long-wave infrared spectral bands, arranged to receive infrared electromagnetic radiation in an operating waveband that includes at least a portion of the mid-wave infrared and at least a portion of the long-wave infrared spectral bands via a front external aperture stop and to focus the infrared electromagnetic radiation onto a rear image plane, the plurality of lenses being positioned between the front external aperture stop and rear image plane and together being configured to provide the dual-band refractive optical system with a field of view of approximately 130 degrees and an optical speed of F/2.0. The optical system may further include a corrector plate positioned coincident with the front aperture stop.

In one example the plurality of lenses consists of eight lenses. The eight lenses may include five positive powered lenses and three negative powered lenses. In one example the material of five of the eight lenses is an optical crown in the operating waveband and wherein the material of three of the eight lenses is an optical flint in operating waveband, such that the optical system is achromatic over the operating waveband. In another example the material of the five lenses is a chalcogenide glass and wherein the material of the three lenses is barium fluoride. In one example the chalcogenide glass is AMTIR-1.

In another example the plurality of lenses includes a first lens positioned proximate the front external aperture stop, a second lens positioned adjacent the first lens, a third lens positioned adjacent the second lens, the second lens being positioned between the first and third lenses, a fourth lens positioned adjacent the third lens, the third lens being positioned between the second and fourth lenses, a fifth lens positioned adjacent the fourth lens, the fourth lens being positioned between the third and fifth lenses, a sixth lens positioned adjacent the fifth lens, the fifth lens being positioned between the fourth and sixth lenses, a seventh lens positioned adjacent the sixth lens, the sixth lens being positioned between the fifth and seventh lenses, and an eighth lens positioned between the seventh lens and the rear image plane. In one example the material of each of the first lens, the fourth lens, and the eighth lens is barium fluoride. In another example the material of each of the second lens, the third lens, the fifth lens, the sixth lens, and the seventh lens is AMTIR-1.

In one example the portion of the mid-wave infrared spectral band spans at least a wavelength range from 3.0 micrometers to 5.0 micrometers. In another example the portion of the long-wave infrared spectral band spans at least a wavelength range from 7.4 micrometers to 10.0 micrometers.

In one example each of the plurality of lenses is an aspheric lens having at least one aspheric surface.

Another embodiment is directed to a dual-band refractive infrared optical imaging system configured for mid-wave infrared and long-wave infrared operation. The system includes a cold shielding housing having an optically transparent window, an infrared imaging detector sensitive to infrared radiation in the mid-wave infrared and long-wave infrared spectral bands, the infrared imaging detector being located within the cold shielding housing, and a refractive optical system including a plurality of lenses, each lens being constructed from a material that is optically transparent in the mid-wave infrared and long-wave infrared spectral bands. The plurality of lenses are disposed within the cold shielding housing and arranged to receive infrared electromagnetic radiation in an operating waveband that includes at least a portion of the mid-wave infrared and at least a portion of the long-wave infrared spectral bands via a front external aperture stop coincident with the optically transparent window of the cold shielding housing and to focus the infrared electromagnetic radiation onto a rear image plane. The plurality of lenses together are configured to provide the dual-band refractive infrared optical imaging system with a field of view of approximately 130 degrees and an optical speed of F/2.0. The infrared imaging detector is positioned at the rear image plane.

In one example the optical imaging system further includes a corrector plate positioned coincident with the front external aperture stop.

In another example each lens of the plurality of lenses is an aspheric lens having at least one aspheric surface.

In one example the infrared imaging detector is a focal plane array sensor.

In one example the plurality of lenses consists of eight lenses. In another example the material of five of the lenses is a chalcogenide glass and the material of three of the lenses is barium fluoride. In one example the chalcogenide glass is AMTIR-1.

In another example the portion of the mid-wave infrared spectral band spans at least a wavelength range from 3.0 micrometers to 5.0 micrometers. In another example the portion of the long-wave infrared spectral band spans at least a wavelength range from 7.4 micrometers to 10.0 micrometers.

According to another embodiment a dual-band refractive optical system configured for mid-wave infrared and long-wave infrared operation includes eight lenses and a corrector plate positioned coincident with a front aperture stop of the system. Five of the eight lenses are constructed from a chalcogenide glass and three of the eight lenses are constructed from barium fluoride. The eight lenses are arranged to receive infrared electromagnetic radiation in an operating waveband that includes at least a portion of the mid-wave infrared spectral band and at least a portion of the long-wave infrared spectral band via the front external aperture stop and to focus the infrared electromagnetic radiation onto a rear image plane, the eight lenses being positioned between the front external aperture stop and rear image plane.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures:

FIG. 2 is a table including an optical prescription for one example of the refractive optical system of FIG. 1.

DETAILED DESCRIPTION

Infrared imaging optical systems are widely used in a variety of applications. The production of infrared light is associated in many cases with the production of heat by hot objects such as engines or by the human body, and for that reason infrared light is widely used to detect such hot objects. In addition, infrared energy is transmitted through many conditions which block visible light, such as clouds of particulate matter or water vapor, and can therefore provide useful imaging data. Generally, an infrared imaging optical system includes an array of lenses that focus the external infrared energy onto a cryogenically cooled detector. The detector converts the incident infrared energy to electrical signals, which are analyzed for infrared signatures that may be associated with particular objects of interest or threats, for example.

Aspects and embodiments are directed to an infrared imaging optical system and an eyepiece-type refractive optical form that can be used in an infrared imaging optical system. The eyepiece has an external front (i.e. object space side) entrance pupil, such that the eyepiece can be packaged inside a cooled chamber, such as a dewar, along with an infrared detector.

One example of a wide field-of-view (WFOV) in-dewar eyepiece can constructed from all-silicon components (lenses and supporting structure) to operate only in the mid-wave infrared (MWIR) spectral band, for example, over the wavelength range of 3.8 to 5.0 micrometers (µm). Another example of a WFOV in-dewar eyepiece may operate only in the long-wave infrared (LWIR) spectral band, for example, over the wavelength range of 7.6 to 8.4 µm. Both of these examples may exhibit significant barrel-type field distortion, for example, approximately 50% and 43%, respectively.

In contrast to these examples, aspects and embodiments provide a WFOV (e.g., 130 degrees FOV) eyepiece-type refractive optical system that can be housed "in-dewar," for example, and which is configured for operation in both the MWIR and LWIR spectral bands at an optical speed of approximately F/2.0. In addition, certain embodiments exhibit significantly reduced barrel-type field distortion compared to the single-color examples mention above, for example, between approximately 11% and 19%.

Figure 1:
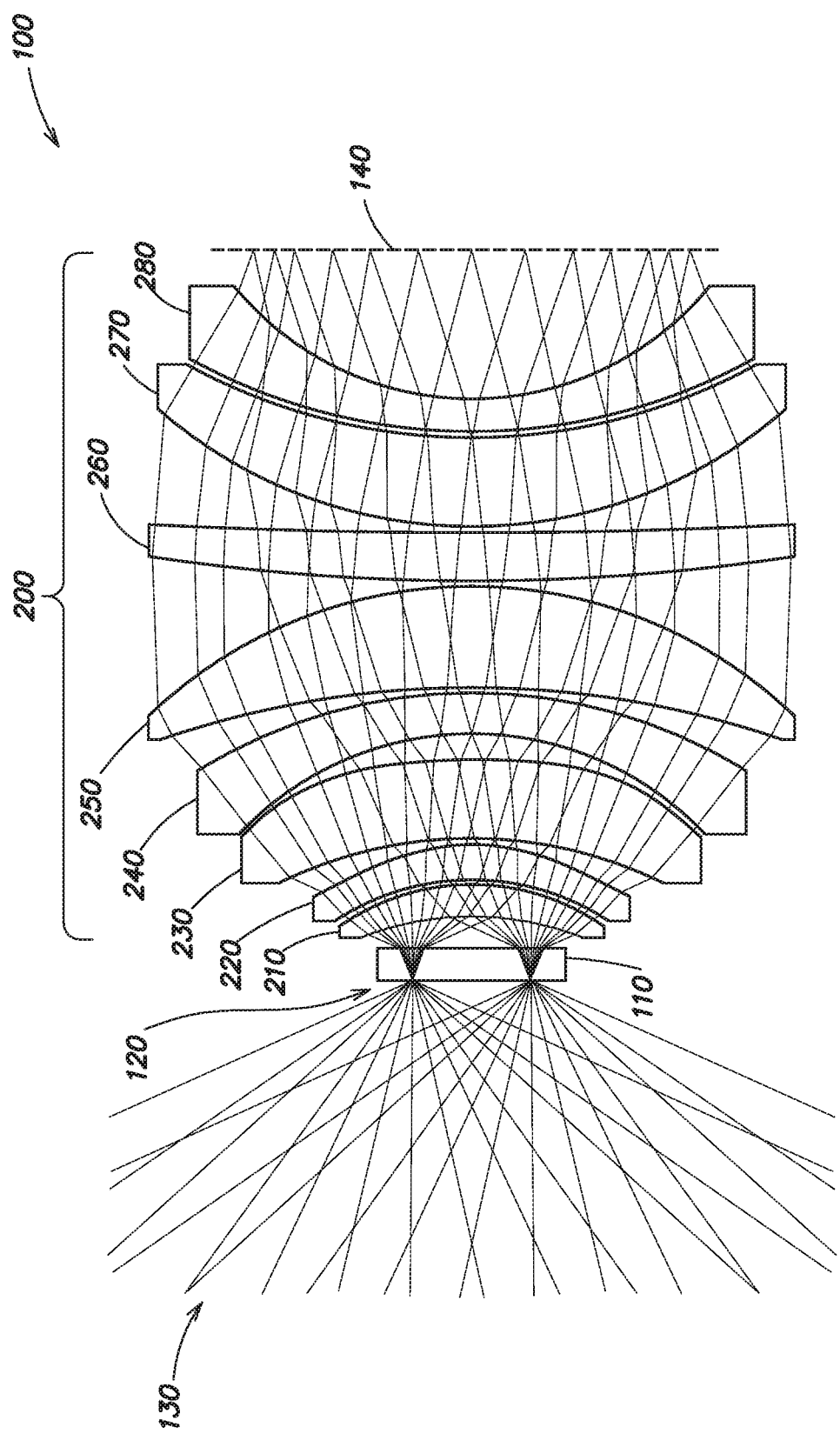
FIG. 1 is a partial ray trace of one example of a refractive optical system according to certain embodiments.

Referring to FIG. 1 there is illustrated a partial ray trace of one example of an eyepiece-type refractive optical system according to certain embodiments. The optical system 100 includes a plurality of lenses arranged to have an eyepiece-type optical form and referred to herein as an eyepiece 200. The system 100 further includes a corrector plate 110 positioned on an object-space side of the eyepiece 200. The system aperture stop 120 is coincident with the corrector plate 110. Infrared electromagnetic radiation 130 is received via the aperture stop 120 and focused by the eyepiece 200 onto an image plane 140. Accordingly, each of the plurality of lenses of the eyepiece 200 can have positive or negative optical power, such that the combination appropriately focuses the infrared electromagnetic radiation 130 onto the image plane 140, as shown in FIG. 1. As discussed above, the optical system 100 may have a very wide field of view, in one example spanning 130 degrees.

In the example of FIG. 1, the eyepiece 200 includes a first lens 210 positioned closest to the corrector plate 110, a second lens 220, a third lens 230, a fourth lens 240, a fifth lens 250, a sixth lens 260, a seventh lens 270, and an eighth lens 280 positioned closest to the image plane 140. Each of the lenses in the eyepiece 200 may be constructed from a material that is optically transparent in both the MWIR and LWIR spectral bands. In one example, the material(s) of the lenses of the eyepiece 200 are selected to be optically transparent and allow operation of the optical system 100 over wavelength ranges of 3.0-5.0 µm (in the MWIR spectral band) and 7.4-10 µm (in the LWIR spectral band). For example, certain lenses of the eyepiece 200 can be constructed from a type of glass referred to as an amorphous material transmitting infrared radiation (known as AMTIR-1; generally, a chalcogenide glass, and specifically Ge33As12Se55), and other lenses of the eyepiece 200 can be constructed from barium fluoride ($BaF_2$). Thus, embodiments of the optical system 100 may provide a "two-color" system that can operate over both the MWIR and LWIR spectral bands, as opposed to the only single-color examples noted above, and in addition, may operate over a much wider portion of the LWIR spectral band than does the single-color LWIR example noted above (2.6 µm wide LWIR bandwidth as opposed to only 0.8 µm wide). In addition, by appropriately selecting the materials of the plurality of lenses of the eyepiece 200, the eyepiece can be configured to be achromatic over the operating wavelength ranges. For example, certain lenses of the eyepiece can be constructed from a material such as $BaF_2$, which is an optical flint in the operating wavelengths ranges, and others from AMTIR-1, which is an optical crown in the operating wavelength ranges. In one example, the eyepiece 200 can include three negative powered flints and five positive powered crowns. The corrector plate 110 can be configured to correct for spherical aberration, thereby further improving the achromatic characteristic of the optical system over the operating wavelength ranges. In one example, the eyepiece 200 may exhibit between 11 and 19% field distortion (barrel-type), and may operate with an optical speed of F/2.0.

The table shown in FIG. 2 provides an example of an optical prescription for one embodiment of the optical system 100 corresponding to FIG. 1 in accord with the aspects and principles disclosed herein. The optical prescription for this example may be generated using an equation which is an industry standard and which would be known to those skilled in the art. In FIG. 2, the second column provides a description of the elements of the optical system, and the reference numerals corresponding to FIGS. 1 and 2 are given in parentheses. The third column, designated Rd, provides the radius of the respective surface, measured in inches. A minus sign indicates that the center of curvature is to the left of the lens surface. The column designated CC is the conic constant which is equal to the negative squared value of the eccentricity of a conic section (a planar cut through a double sheeted conic surface). The columns designated Ad, Ae, Af and Ag are the aspheric constants of the specific lens surfaces. The column designated "Thickness" provides the distance between the respective surface and the next surface (identified in the adjacent lower row of the table), measured in inches. The column designated "Material" provides the material of the respective surface. It is to be appreciated that the prescription given in FIG. 2 is merely exemplary, and that the prescriptions of various embodiments of the optical system 100 are determined by the intended task to be performed by the optical system and desired system characteristics.

Figure 3:
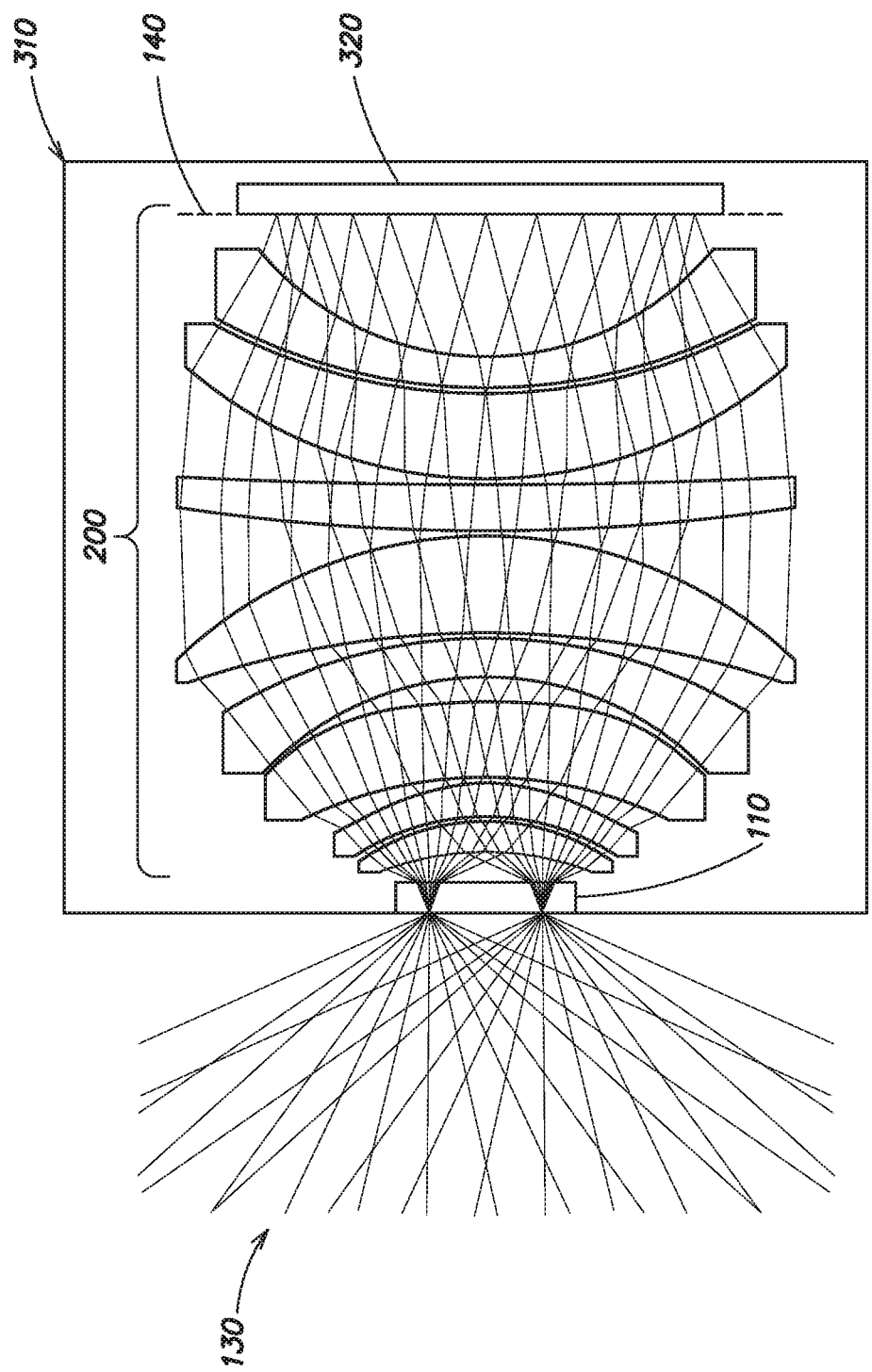
FIG. 3 is a block diagram and partial ray trace of an optical imaging system including the refractive optical system of FIG. 1.

Thus, aspects and embodiments of the optical system 100 provide the combined capability of a dual-band MWIR and LWIR imaging with a very wide field of view obtained through the eyepiece-type refractive optical form. The front aperture stop 110 allows for use inside a cold cavity, as shown in FIG. 3, for example. Referring to FIG. 3, in certain embodiments the eyepiece 200 can be contained with a cold cavity or housing 310, such as a dewar or other cryo-vac chamber. The housing 310 may have an optically transparent window positioned coincident with the aperture stop 120. The corrector plate 110 can be integrated with the window of the housing 310, or may be placed inside the housing, very close to the aperture stop 120. An infrared detector 320, such as a focal plane array, for example, can be positioned inside the housing 310 (for cryogenic cooling) at the image plane 140. Embodiments of the optical system 100 constructed according to the designs shown and described herein, such as, but not limited to the optical prescription given in FIG. 2, may provide a high resolution, low-aberration refractive optical train for two-color infrared imaging.

Having described above several aspects of at least one embodiment, it is to be appreciated various alterations, modifications, and improvements will readily occur to those skilled in the art. Such alterations, modifications, and improvements are intended to be part of this disclosure and are intended to be within the scope of the invention. Embodiments of the optical system are not limited in application to the details of construction and the arrangement of components set forth in the above description or illustrated in the accompanying drawings, and are capable of implementation in various ways. Examples of specific implementations are provided herein for illustrative purposes only and are not intended to be limiting. Also, the phraseology and terminology used herein are for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Accordingly, the foregoing description and drawings are by way of example only, and the scope of the invention should be determined from proper construction of the appended claims, and their equivalents.

What is claimed is:

1. A dual-band refractive optical system configured for mid-wave infrared and long-wave infrared operation comprising:
    an eyepiece having a field of view of approximately 130 degrees and an optical speed of F/2.0, the eyepiece consisting of a plurality of lenses, each constructed from a material that is optically transparent in the mid-wave infrared and long-wave infrared spectral bands, arranged to receive infrared electromagnetic radiation in an operating waveband that includes at least a portion of the mid-wave infrared and at least a portion of the long-wave infrared spectral bands via a front external aperture stop and to focus the infrared electromagnetic radiation onto a rear image plane, the plurality of lenses being positioned between the front external aperture stop and rear image plane; and
    a corrector plate positioned coincident with the front aperture stop and configured to correct for spherical aberration in the eyepiece.

2. The dual-band refractive optical system of claim 1 wherein the plurality of lenses consists of eight lenses.

3. The dual-band refractive optical system of claim 2 wherein the eight lenses include five positive powered lenses and three negative powered lenses.

4. The dual-band refractive optical system of claim 2 wherein the material of five of the eight lenses is an optical crown in the operating waveband and wherein the material of three of the eight lenses is an optical flint in operating waveband, such that the optical system is achromatic over the operating waveband.

5. The dual-band refractive optical system of claim 4 wherein the material of the five lenses is a chalcogenide glass and wherein the material of the three lenses is barium fluoride.

6. The dual-band refractive optical system of claim 1 wherein the plurality of lenses consists of:
    a first lens positioned proximate the front external aperture stop;

a second lens positioned adjacent the first lens;

a third lens positioned adjacent the second lens, the second lens being positioned between the first and third lenses;

a fourth lens positioned adjacent the third lens, the third lens being positioned between the second and fourth lenses;

a fifth lens positioned adjacent the fourth lens, the fourth lens being positioned between the third and fifth lenses;

a sixth lens positioned adjacent the fifth lens, the fifth lens being positioned between the fourth and sixth lenses;

a seventh lens positioned adjacent the sixth lens, the sixth lens being positioned between the fifth and seventh lenses; and an eighth lens positioned between the seventh lens and the rear image plane.

7. The dual-band refractive optical system of claim 6 wherein the material of each of the first lens, the fourth lens, and the eighth lens is barium fluoride.

8. The dual-band refractive optical system of claim 7 wherein the material of each of the second lens, the third lens, the fifth lens, the sixth lens, and the seventh lens is AMTIR-1.

9. The dual-band refractive optical system of claim 1 wherein the portion of the mid-wave infrared spectral band spans at least a wavelength range from 3.0 micrometers to 5.0 micrometers.

10. The dual-band refractive optical system of claim 9 wherein the portion of the long-wave infrared spectral band spans at least a wavelength range from 7.4 micrometers to 10.0 micrometers.

11. The dual-band refractive optical system of claim 1 wherein each of the plurality of lenses is an aspheric lens having at least one aspheric surface.

12. A dual-band refractive infrared optical imaging system configured for mid-wave infrared and long-wave infrared operation, comprising:

a cold shielding housing having an optically transparent window;

an infrared imaging detector sensitive to infrared radiation in the mid-wave infrared and long-wave infrared spectral bands, the infrared imaging detector being located within the cold shielding housing; and a refractive optical system including a plurality of lenses and having a field of view of approximately 130 degrees and an optical speed of F/2.0, each lens being constructed from a material that is optically transparent in the mid-wave infrared and long-wave infrared spectral bands, the plurality of lenses being disposed within the cold shielding housing and arranged to receive infrared electromagnetic radiation in an operating waveband that includes at least a portion of the mid-wave infrared and at least a portion of the long-wave infrared spectral bands via a front external aperture stop coincident with the optically transparent window of the cold shielding housing and to focus the infrared electromagnetic radiation onto a rear image plane, the infrared imaging detector being positioned at the rear image plane.

13. The dual-band refractive infrared optical imaging system of claim 12 further comprising a corrector plate positioned coincident with the front external aperture stop and configured to correct for spherical aberration in the refractive optical system.

14. The dual-band refractive infrared optical imaging system of claim 12 wherein each lens of the plurality of lenses is an aspheric lens having at least one aspheric surface.

15. The dual-band refractive infrared optical imaging system of claim 12 wherein the infrared imaging detector is a focal plane array sensor.

16. The dual-band refractive infrared optical imaging system of claim 12 wherein the plurality of lenses consists of eight lenses.

17. The dual-band refractive infrared optical imaging system of claim 16 wherein the material of five of the lenses is a chalcogenide glass and wherein the material of three of the lenses is barium fluoride.

18. The dual-band refractive infrared optical imaging system of claim 12 wherein the portion of the mid-wave infrared spectral band spans at least a wavelength range from 3.0 micrometers to 5.0 micrometers.

19. The dual-band refractive infrared optical imaging system of claim 18 wherein the portion of the long-wave infrared spectral band spans at least a wavelength range from 7.4 micrometers to 10.0 micrometers.

20. A dual-band refractive optical system configured for mid-wave infrared and long-wave infrared operation comprising:

eight lenses, five of the eight lenses being constructed from a chalcogenide glass and three of the eight lenses being constructed from barium fluoride, the eight lenses being arranged to receive infrared electromagnetic radiation in an operating waveband that includes at least a portion of the mid-wave infrared spectral band and at least a portion of the long-wave infrared spectral band via a front external aperture stop and to focus the infrared electromagnetic radiation onto a rear image plane, the eight lenses being positioned between the front external aperture stop and rear image plane; and a corrector plate positioned coincident with the front aperture stop and configured to correct for spherical aberration in the dual-band refractive optical system.

* * * * *